United States Patent [19]
Cotter et al.

[11] Patent Number: 6,003,848
[45] Date of Patent: Dec. 21, 1999

[54] COMPACT GAS SPRING

[75] Inventors: Jonathan P. Cotter, Dearborn; Patrick J. Cotter, Plymouth, both of Mich.

[73] Assignee: Diebolt International, Inc., Plymouth, Mich.

[21] Appl. No.: 08/886,241

[22] Filed: Jul. 1, 1997

[51] Int. Cl.[6] ........................................ F16F 5/00
[52] U.S. Cl. .................... 267/64.11; 267/64.12; 188/322.16; 277/558
[58] Field of Search ................. 267/64.12, 64.11, 267/64.22, 64.28, 118, 119, 129, 182; 188/322.14, 322.16, 322.17, 322.18, 322.21, 300, 382, 371; 277/558, 565

[56] References Cited

U.S. PATENT DOCUMENTS

| | | | |
|---|---|---|---|
| 4,792,128 | 12/1988 | Holley | 267/118 |
| 4,838,527 | 6/1989 | Holley | 267/64.28 |
| 4,987,826 | 1/1991 | Deppert et al. | 92/168 |
| 5,011,121 | 4/1991 | Oriola et al. | 267/64.11 |
| 5,129,635 | 7/1992 | Holley | 267/129 |
| 5,275,387 | 1/1994 | Cotter et al. | 267/64.11 |
| 5,303,906 | 4/1994 | Cotter et al. | 267/64.11 |
| 5,344,125 | 9/1994 | Cotter | 267/119 |

*Primary Examiner*—Lee W. Young
*Assistant Examiner*—Pamela J. Lipka
*Attorney, Agent, or Firm*—Barnes, Kisselle, Raisch, Choate, Whittemore & Hulbert, P.C.

[57] ABSTRACT

A gas spring with a sealing and bearing assembly received within a casing of the gas spring adjacent to a rod slidably received through the assembly for axial reciprocation. The assembly has an annular retaining ring received within the casing, an annular bearing with a throughbore through which the rod reciprocates carried by the retaining ring, an annular retainer carried by the retaining ring downstream of the bearing, and a sealing member received within the retaining ring adjacent to the retainer and in firm engagement with the rod and retaining ring to provide a gas-tight seal between the rod and the retaining ring to prevent the escape of gas from the gas spring. The retainer preferably has a dovetail flange extending therefrom and the sealing ring has a complementarily shaped recess molded or press-fit onto the flange to attach the sealing ring to the retainer. The retainer is preferably firmly clamped to the retaining ring by rolling its upper edge over the retainer. To prevent contaminants from entering the gas spring and fouling the bearing and sealing assembly, a wiper is provided downstream of the sealing member and attached to the retainer.

18 Claims, 2 Drawing Sheets

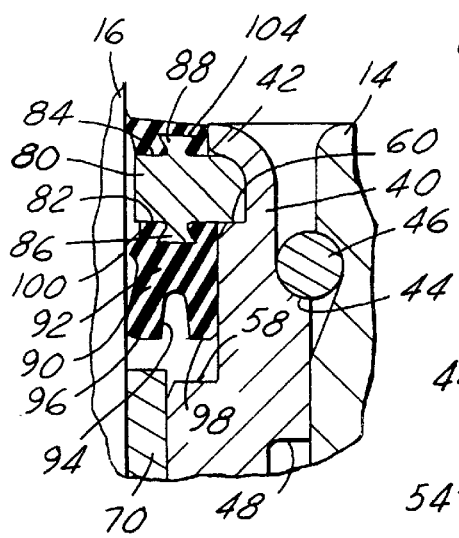
FIG.2
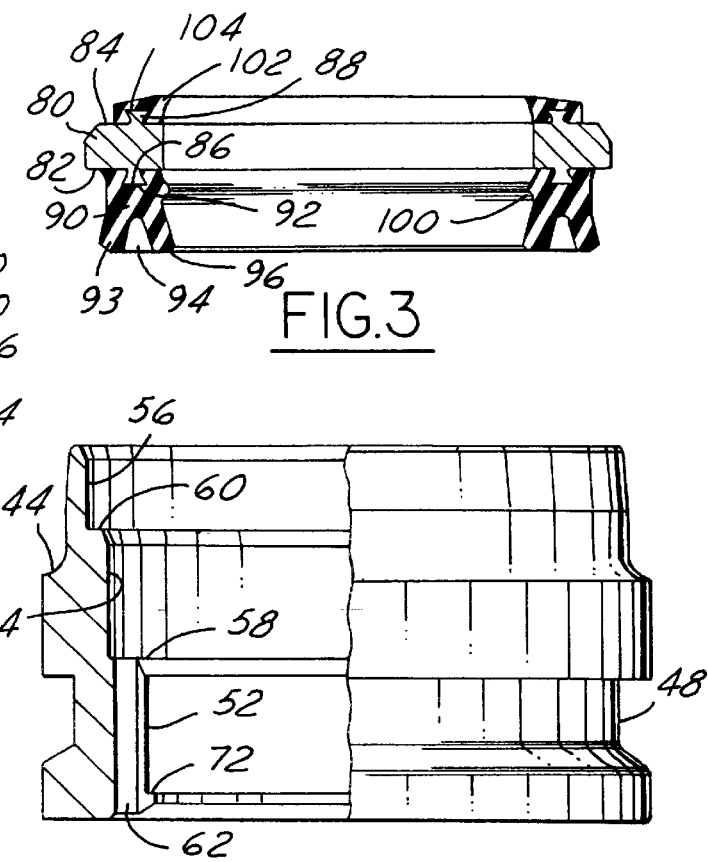
FIG.3
FIG.4
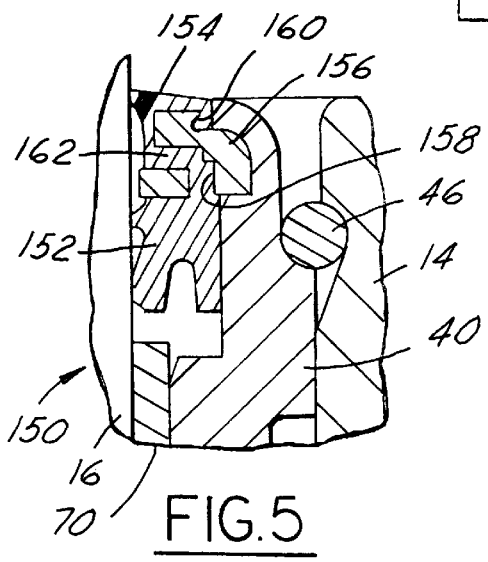
FIG.5
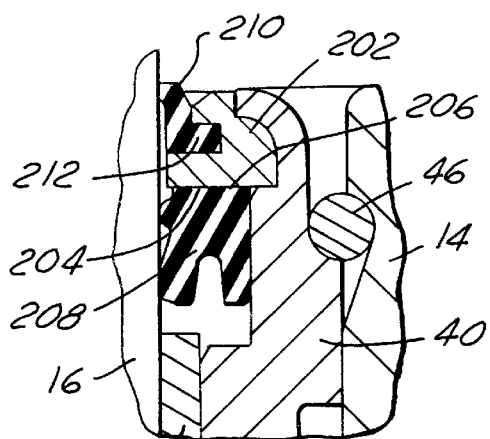
FIG.7
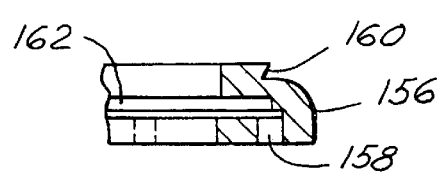
FIG.6

6,003,848

COMPACT GAS SPRING

FIELD OF THE INVENTION

This invention relates to gas springs and more particularly to a bearing and sealing assembly for a compact gas spring.

BACKGROUND OF THE INVENTION

Gas springs may be utilized to yieldably resist movement of a body such as a clamping ring for a metal blank of a die in a press for forming sheet metal parts. The springs are generally constructed with an actuating rod connected to a piston, slidably received in a cylinder having a chamber charged to a predetermined pressure with an inert gas such as nitrogen. This provides a spring effect or cushion permitting the rod to yieldably move toward its retracted position when a force applied externally to the rod exceeds the opposing force produced by the gas in the chamber acting on the piston. The gas springs can be operated with either an external source of gas or can be precharged and operated as a self-contained unit.

In use, as the piston approaches its retracted position, thereby decreasing the volume of the gas chamber, the pressure within the chamber may increase to between 3,000 and 5,000 psi or more. To maintain the axial movement of the piston rod and also to ensure a sufficient seal of the gas spring to prevent pressure losses in the gas spring, current gas springs have bearing, sealing, and retaining members which are relatively large and thus reduce the internal volume of the gas chamber within the gas spring. The smaller gas chamber leads to increased pressure and also increased temperatures within the gas spring which can be detrimental to the operation of the gas spring. Thus, the gas spring must be made larger in size to provide a sufficient gas chamber volume.

SUMMARY OF THE INVENTION

A gas spring has a sealing and bearing assembly received within the casing of the gas spring adjacent to a piston rod slidably received through the assembly for axial reciprocation which comprises an annular retaining ring received within the casing, an annular bearing with a throughbore through which the rod reciprocates carried by the retaining ring, an annular retainer operably carried by the retaining ring downstream of the bearing, and a sealing member received within the retaining ring adjacent to the retainer and in firm engagement with the rod and retaining ring to provide a gas-tight seal between the rod and the retaining ring to prevent the escape of gas from the gas spring. The retainer preferably has a dovetail flange extending therefrom and the sealing ring has a complementarily shaped recess constructed to be press-fit or molded onto the flange to attach the sealing ring to the retainer. The retainer is preferably firmly clamped between an annular shoulder within the retaining ring and the upper edge of the retaining ring by rolling the upper edge of the retaining ring over the retainer.

The bearing and seal assembly is compact having a relatively short axial length to provide an increased volume of the gas chamber defined between the rod, bearing and seal assembly and the casing wall thereby allowing use of a smaller casing while maintaining sufficient gas chamber volume to prevent excessive heat or pressure build-up in the gas spring and to allow the piston to reciprocate through a sufficiently long stroke.

Objects, features and advantages of this invention include providing a more compact gas spring, a bearing and seal combined in a single assembly to facilitate assembly and replacement of the bearing and seal, an increased gas chamber volume within a smaller casing to permit sufficient compression of the gas within the chamber without overheating of the gas spring, a sufficiently long piston rod stroke, a low operating temperature, can be operated as a self-contained unit, is rugged, durable, reliable and of relatively simple design, economical manufacture and assembly, and has in-service a long useful life.

BRIEF DESCRIPTION OF THE DRAWINGS

These and other objects, features and advantages of this invention will be apparent from the following detailed description of the preferred embodiment and best mode, appended claims and accompanying drawings in which:

FIG. 2 is an enlarged sectional view of the encircled portion in FIG. 1;

FIG. 3 is a sectional view of the retainer, wiper and sealing ring;

FIG. 4 is a side view partially in section of a retaining ring;

FIG. 5 is a partial sectional view of an alternate embodiment of the bearing and seal assembly;

FIG. 6 is a partial sectional view of the retainer of FIG. 5;

FIG. 7 is a partial sectional view of a third embodiment of the bearing and seal assembly; and FIG. 8 is a plan view of an alternate bearing construction.

DETAIL DESCRIPTION OF THE PREFERRED EMBODIMENT

Figure 1:
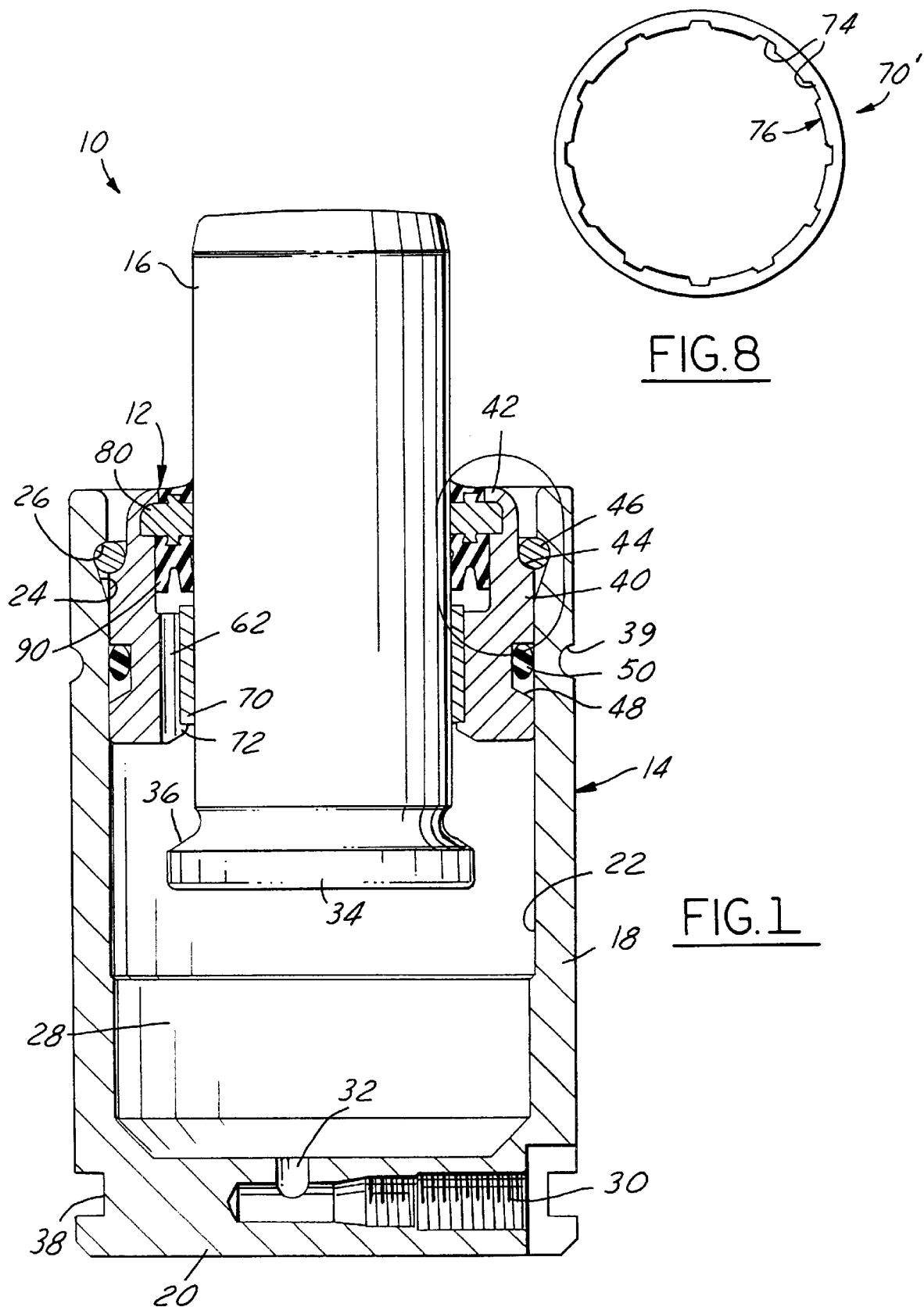
FIG. 1 is a sectional view of a gas spring embodying this invention.

Referring in more detail to the drawings, FIG. 1 shows a compact gas spring 10 embodying this invention and having a sealing and bearing assembly 12 received within a casing 14 of the gas spring and a piston rod 16 slidably received through the sealing and bearing assembly 12 for axial reciprocation. The casing 14 is an open ended tubular member with a circumferentially continuous side wall 18 and a base 20 preferably integrally formed with the side wall 18 and closing one end of the casing 14. The interior surface 22 of the casing 14 has an annular groove 24 formed to provide a shoulder or stop 26 surface. To admit gas into a gas chamber 28 defined at least in part by the casing 14 and the piston rod 16 and to control the pressure of the gas within the chamber 28, a filler valve 30, preferably as disclosed in U.S. Pat. No. 5,344,125, is threadably received within the base 20 in communication with a fill passage 32 through which gas flows into the chamber 28.

The piston rod 16 is an elongated cylindrical member having an enlarged end portion or piston 34 preferably integrally formed with the piston rod 16 and received within the gas chamber 28. The enlarged diameter piston 34 provides a shoulder 36 which bears on the sealing and bearing assembly 12 when the piston rod 16 is at its fully extended position to retain the piston 34 and rod within the casing 14. To facilitate mounting and removing the gas spring 10 annular grooves 38, 39 are provided in the outer surface of the casing 14.

As shown in FIG. 2, the sealing and bearing assembly 12 has an annular retaining ring 40 slidably received in the casing 14. To releasably retain the retaining ring 40 within the casing 14 the retaining ring 40 has a reduced diameter downstream end 42 providing a radially extending shoulder 44 engageable with a ring segment 46 received between the shoulder 44 and the annular groove 24 on the interior surface 22 of the casing 14. To provide a seal between the retaining ring 40 and the casing 14 to prevent gas leakage between them, a sealing member such as an O-ring 50 is received in an annular groove 48 formed in the retaining ring. As shown in FIGS. 1, 2 and 4, the retaining ring 40 has a cylindrical through bore 52, a first counterbore 54 and a second counterbore 56 providing a first shoulder 58 and a second shoulder 60 on the interior surface of the retaining ring 40. A plurality of axially extending grooves 62 are formed in the retaining ring 40 communicating the first counterbore 54 with the chamber 28 to permit gas in the chamber 28 to move freely through the grooves 62 and into the first counterbore 54.

An annular bearing 70 is press-fit into and carried by the retaining ring 40 encircling and closely adjacent to the piston rod 16 to guide the piston rod 16 for axial reciprocation. The bearing 70 is preferably formed of sintered bronze impregnated with lubricant or of wear and friction resistant plastics such as Polyimides, ultrahigh molecular weight (UHMW) materials such as UHMW—Polyethylene, Polytetrafluoroethylene and various fiber matrix and thermoplastic composites. Preferably, to limit the insertion of the bearing 70, the retaining ring 40 has an inwardly extending rib or rim 72 constructed to be engaged by the bearing 70. The rim 72 is preferably spaced from the upstream end of the retaining ring 40 so the bearing 70 is received at least slightly set in from the upstream end of the retaining ring 40 to ensure that the piston 34 contacts the retaining ring 40, and not the bearing 70 or rim 72, to limit the piston 34 travel.

Alternatively, as shown in FIG. 8, the bearing 70' has a plurality of circumferentially spaced and axially extending grooves 74 formed in its inner surface 76. These grooves 74 communicate the first counterbore 54 with the chamber 28 and may be used instead of the grooves 62 formed in the retaining ring 40. The grooves 74 in the bearing 70' also facilitate introduction of lubricant between the bearing 70' and piston rod 16. Further, when formed of plastic, the bearing 70' is more tolerant of expansion caused by an increase in temperature as an increase in circumference of the bearing 70' tends to compress the grooves 74 slightly due to the decreased bearing wall thickness adjacent the grooves 74. The grooves 74 are not in contact with the piston rod 16 and thus, the integrity of the bearing 70' and piston rod 16 interface is not adversely affected when the grooves 74 are compressed due to expansion of the bearing 70'.

An annular retainer 80 is carried by the retaining ring 40 with its upstream face 82 engaged with the second shoulder 60. To firmly clamp the retainer 80 within the retaining ring 40, the downstream end 42 of the retaining ring 40 is rolled over the perimeter of the downstream face 84 of the retainer 80. As shown in FIG. 3, the retainer 80 preferably has a pair of annular and preferably circumferentially continuous dovetail extensions 86, 88 with one dovetail 86 extending from its upstream face 82 and the other dovetail 88 extending from its downstream face 84.

An annular sealing member 90 is disposed within the first counterbore 54 adjacent the upstream face 82 of the retainer 80 and adjacent to and circumferentially surrounding the piston rod 16. The sealing member 90 preferably has an inner diameter slightly smaller than the outer diameter of the piston rod 16 and an outer diameter slightly larger than the diameter of the first counterbore 54 such that the sealing member 90 is stretched around the piston rod 16 and compressed between the retaining ring 40 and the piston rod 16 to provide a gas tight seal adjacent both the retaining ring 40 and the piston rod 16. The sealing member 90 has a recess 92 complementarily shaped to the adjacent dovetail extension 86 of the retainer 80 and is press fit or molded thereon to retain the sealing member 90 on the retainer 80. The upstream end of the sealing member 90 is preferably provided with an annular groove 94 forming an inner lip 96 and an outer lip 98 each of which is flexible, compressible and somewhat resilient. The high pressure gas of the gas spring 10 is communicated with the upstream end of the sealing member 90 through the grooves 62 or 74 formed in the retaining ring 40 or the bearing 70' and the pressure tends to separate the inner lip 96 and outer lip 98 forcing the outer lip 98 into firm engagement with the retaining ring providing a seal therebetween and forcing the inner lip 96 into firm engagement with the piston rod 16 to provide a seal between it and the sealing member 90. The sealing member 90 also preferably has an annular rib 100 extending inwardly and constructed to bear on the piston rod 16 at a circumferential location spaced from the seal between the inner lip 96 and the piston rod 16 to provide a second seal between the sealing member 90 and piston rod 16.

A wiper 102 is provided adjacent the downstream face 84 of the retainer 80 and has a recess 104 complementarily shaped to the dovetail extension 88 of that face 84 and is preferably press-fit or molded thereon to attach the wiper 102 to the retainer 80. The wiper 102 is preferably an annular ring of a flexible and compressible elastomeric material and has an inner diameter slightly smaller than the outer diameter of the piston rod 16 to circumferentially engage the piston rod 16 to rub or wipe the piston rod 16 as it reciprocates to prevent contaminants from entering the gas spring 10 and fouling the sealing member 90 or bearings 70 therein.

In an alternate embodiment 150, as shown in FIG. 5, a sealing member 152 and a wiper 154 are an integral body of a flexible and compressible elastomeric material integrally molded around and within the retainer 156 through passages 158 provided in the retainer 156. Preferably, as shown in FIG. 6, the passages 158 extend axially and radially through the retainer 156 to prevent the sealing member 152 from being forced or extruded through the passages 158 by the high pressure of the gas acting on its upstream end. Preferably, to retain the wiper 154 portion, the retainer 156 has an undercut groove 160 and an annular recess 162, which receive a portion of the wiper 154 during the molding process and helps to attach the wiper 154 to prevent downstream movement of the wiper 154 relative to the retainer 156.

In another embodiment 200, as shown in FIG. 7, the retainer 202 has a flat upstream face 204 which is firmly engaged by a flat face 206 of the sealing member 208 compressed against the face 204 of the retainer 202 by the pressure of the gas acting on the upstream end of the sealing member 208. The wiper 210 is received within an annular recess or slot 212 formed in the retainer 202 and is preferably molded therein to firmly engage the piston rod 16 as its reciprocates.

In assembly, the bearing 70 or 70' is press-fit into the retaining ring 40. The sealing member 90 and wiper 102 are press-fit or molded onto the dovetail extensions 86, 88 of the retainer 80 and the retainer 80 is inserted into the downstream end 42 of the retaining ring 40 until it engages the second shoulder 60. The downstream end 42 of the retaining ring 40 is then rolled over the perimeter of the retainer 80 to firmly clamp the retainer 80. An O-ring 50 or other such sealing member is fitted around the exterior of the retaining ring 40 within the groove 48 and the entire bearing and sealing assembly 12 is inserted onto the piston rod 16. The piston rod 16 and bearing and sealing assembly 12 are then inserted into the open end of the casing 14 with the piston 34 received within the chamber 28. A ring segment 46 is inserted into the casing 14 and is received between the groove 24 in the interior of the casing 14 and the shoulder 44 of the exterior of the retaining ring 40 to prevent downstream movement of the retaining ring 40. Pressurized gas is then admitted into the gas chamber 28 through the filler valve 30 and fill passage 32. In use, the gas spring 10 can be operated in communication with an external supply of gas or the filler valve 30 can be closed and the gas spring 10 operated as a self-contained unit.

The sealing and bearing assembly 12 has a relatively small overall size and takes up less volume within the casing 14 than those in prior gas springs. This enables a smaller casing 14 to be used without decreasing the volume of the gas chamber 28 or reducing the length of the piston rod stroke 16. The increased volume in the smaller casing 14 of the gas spring 10 also prevents excessive temperature and pressure increases with the gas spring 10 during use. Further, the sealing and bearing assembly 12 enables fast and easy replacement of the bearing 70, 70', seal 90 or wiper 102 when they become worn during use. The integral bearing and sealing assembly 12 is also less expensive to manufacture and is more efficient and less expensive to assemble and in-service has a long useful life.

We claim:

1. A gas spring comprising:
   a tubular casing having a chamber therein for containing gas under pressure and an annular wall defining an opening at one end of the chamber and having a groove formed therein;
   a ring segment received in the groove;
   a rod received in the chamber for generally axial reciprocation therein and projecting from the chamber through the opening;
   a bearing and seal assembly at least partially received in the chamber and having an annular retaining ring received within the casing and having a shoulder engageable with the ring segment to retain the bearing and seal assembly within the casing, a bearing carried by the retaining ring and having a through bore for slidably receiving the rod, an annular retainer received within and carried by the retaining ring downstream of the bearing and restrained from movement relative to the retaining ring, and a sealing member carried by the retaining ring downstream of all bearings and received within the retaining ring upstream of the annular retainer and providing a seal between the rod and the retaining ring.

2. The gas spring of claim 1 which also comprises an annular wiper circumferentially engaging the rod downstream of the retainer.

3. The gas spring of claim 2 wherein the retainer has a projection adjacent the wiper and the wiper has a recess constructed to receive the projection to attach the wiper to the retainer.

4. The gas spring of claim 2 wherein the retainer has a passage therethrough and the wiper and sealing member are integrally formed on opposite sides of the retainer and joined through the passage.

5. The gas spring of claim 2 wherein the retainer has a circumferentially continuous slot constructed to at least partially receive the wiper to retain the wiper.

6. The gas spring of claim 1 wherein the retainer has a projection and the sealing member has a recess constructed to receive the projection to attach the sealing member to the retainer.

7. The gas spring of claim 1 wherein the retaining ring has at least one slot communicating the chamber with the sealing member.

8. The gas spring of claim 7 wherein the sealing member is of a compressible and flexible material and the pressure of the gas acting on the sealing member tends to compress the sealing member and urge at least a portion of the sealing member into engagement with the rod to ensure a seal between the sealing member and the rod.

9. The gas spring of claim 8 wherein the pressure of the gas acting on the sealing member urges at least a portion of the sealing member into firm engagement with the retaining ring to ensure a seal between the sealing member and the retaining ring.

10. The gas spring of claim 1 wherein the retaining ring has one end rolled over the perimeter of the retainer to prevent movement of the retainer beyond that end of the retaining ring.

11. The gas spring of claim 10 wherein the retaining ring has a stop on its inner surface and the retainer bears on the stop when the end of the retaining ring is rolled over to firmly clamp the retainer on the retaining ring.

12. The gas spring of claim 1 which also comprises a piston received within the chamber, operably associated with the rod, and having a maximum outside diameter larger than that of the rod.

13. The gas spring of claim 12 wherein the retaining ring has a stop on which the piston bears when the rod is at its fully extended position to limit the travel of the rod.

14. The gas spring of claim 1 which also comprises a stop adjacent the casing and retaining ring on which the retaining ring bears to prevent further movement of the retaining ring toward the stop.

15. The gas spring of claim 1 wherein the casing has a groove formed therein and a ring segment is partially received in the groove adjacent its downstream face and engaged adjacent its upstream face by the retaining ring to retain the retaining ring within the casing.

16. The gas spring of claim 1 wherein the bearing comprises at least one of a polyimide, ultrahigh molecular weight polyethylene and a ultrahigh molecular weight polytetrafluorethylene material.

17. A gas spring comprising:
   a tubular casing having a chamber therein for containing gas under pressure and an annular wall defining an opening at one end of the chamber;
   a rod received in the chamber for generally axial reciprocation therein and projecting from the chamber through the opening;
   a bearing and seal assembly at least partially received in the chamber and having an annular retaining ring received within the casing, a bearing carried by the retaining ring and having a through bore for slidably receiving the rod, an annular retainer carried by the retaining ring downstream of the bearing and restrained from movement relative to the retaining ring, and a sealing member carried by the retaining ring and received within the retaining ring upstream of the retainer and providing a seal between the rod and the retaining ring, the retaining ring has one end rolled over the perimeter of the retainer to prevent movement of the retainer beyond that end of the retaining ring.

18. The gas spring of claim 17 wherein the retaining ring has a stop on its inner surface and the retainer bears on the stop when the end of the retaining ring is rolled over to firmly clamp the retainer on the retaining ring.

* * * * *